(12) United States Patent
Zhang et al.

(10) Patent No.: US 10,264,797 B2
(45) Date of Patent: Apr. 23, 2019

(54) DEVICE AND METHOD FOR PREPARING EXTRUDABLE FOOD PRODUCTS

(71) Applicant: KONINKLIJKE PHILIPS N.V., Eindhoven (NL)

(72) Inventors: Jian Zhang, Eindhoven (NL); Tao Tao Song, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 15 days.

(21) Appl. No.: 14/652,241

(22) PCT Filed: Jul. 26, 2013

(86) PCT No.: PCT/IB2013/056145
§ 371 (c)(1),
(2) Date: Jun. 15, 2015

(87) PCT Pub. No.: WO2014/096989
PCT Pub. Date: Jun. 26, 2014

(65) Prior Publication Data
US 2015/0366220 A1 Dec. 24, 2015

(30) Foreign Application Priority Data

Dec. 17, 2012 (WO) ................ PCT/CN2012/086795

(51) Int. Cl.
*A21C 3/04* (2006.01)
*A21C 11/20* (2006.01)
(Continued)

(52) U.S. Cl.
CPC ................ *A21C 3/04* (2013.01); *A21C 11/20* (2013.01); *A23P 30/20* (2016.08); *A21C 1/1455* (2013.01); *A21C 1/1465* (2013.01)

(58) Field of Classification Search
CPC ....... A21C 1/06; A21C 1/1455; A21C 1/1465; A21C 3/04; A21C 11/20; A47J 43/04; B29C 47/60
See application file for complete search history.

(56) References Cited

U.S. PATENT DOCUMENTS 4,146,333 A * 3/1979 Zani .......................... A21C 1/06
366/279
4,391,575 A * 7/1983 Osrow ...................... A21C 1/06
366/196

(Continued)

FOREIGN PATENT DOCUMENTS

| CN | 203619389 U | 6/2014 |
|---|---|---|
| EP | 0050409 A2 | 4/1982 |
| JP | 2008-48699 * | 3/2008 |

*Primary Examiner* — James P Mackey

(57) ABSTRACT

A device for preparing extrudable food products includes a working chamber configured to house ingredients in operation of the device, an extrusion die, a rotation shaft configured to stir the ingredients and extrude the food products through the extrusion die, and a driving system by which the rotation shaft is driven. The driving system is configured to separate the extrusion by at least one time period during which the rotation shaft rotates in a first direction which is opposite to a second direction in which the rotation shaft rotates to extrude the food products. Therefore, build-ups inside the working chamber can be removed by the sticky dough hit and/or lifted by the stirring bars on the rotation shaft when the rotation shaft rotates reversely.

10 Claims, 9 Drawing Sheets

(51) Int. Cl.
*A23P 30/20* (2016.01)
*A21C 1/14* (2006.01)

(56) References Cited

U.S. PATENT DOCUMENTS

| | | | | |
|---|---|---|---|---|
| 4,415,323 A | * | 11/1983 | Osrow | A21C 11/20 |
| | | | | 425/376.1 |
| 5,228,775 A | | 7/1993 | Horn | |
| 5,324,185 A | | 6/1994 | Backus | |
| 5,393,217 A | | 2/1995 | Cheng | |
| 5,409,365 A | | 4/1995 | Su | |
| 5,460,506 A | * | 10/1995 | Price, IV | A21C 1/06 |
| | | | | 366/158.1 |
| 5,827,549 A | | 10/1998 | Rancich | |
| 6,743,007 B2 | | 6/2004 | Backus | |
| 2003/0065425 A1 | | 4/2003 | Goodwin | |
| 2006/0210666 A1 | | 9/2006 | Ouriev | |

* cited by examiner

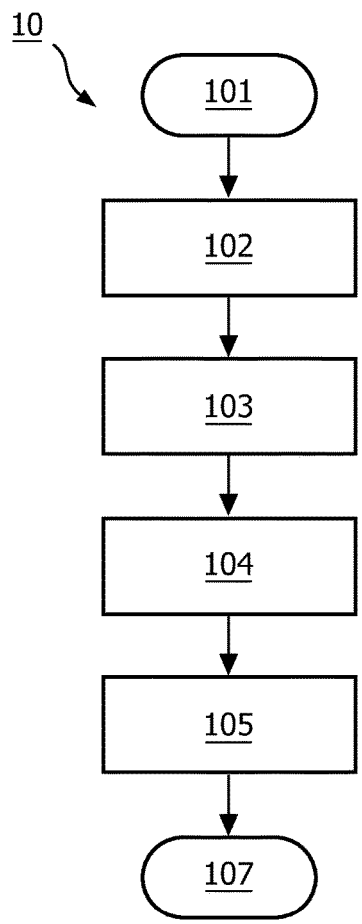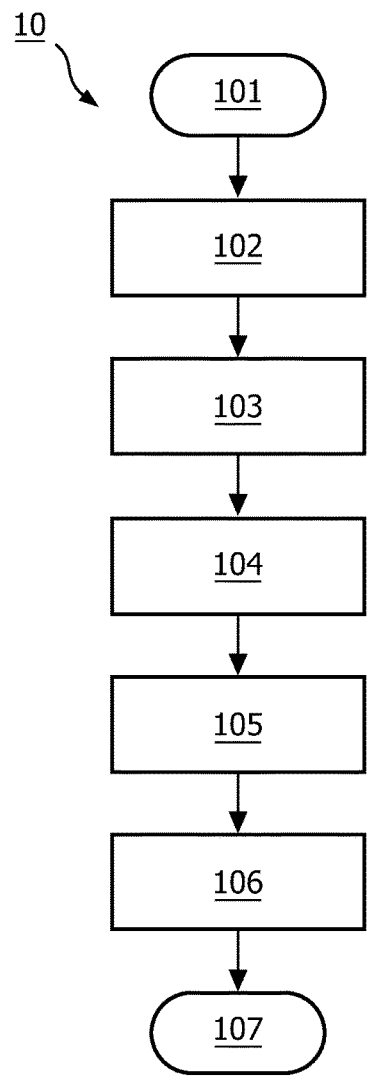
FIG. 10a
FIG. 10b

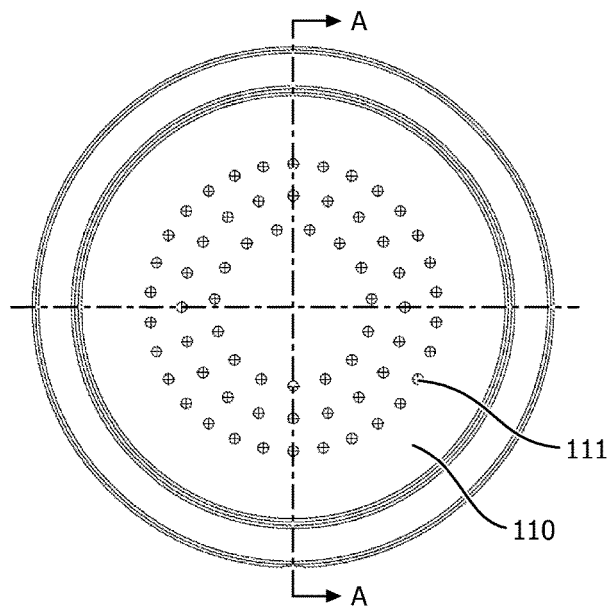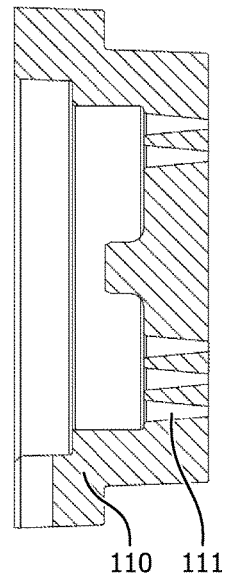
FIG. 11a  FIG. 11b
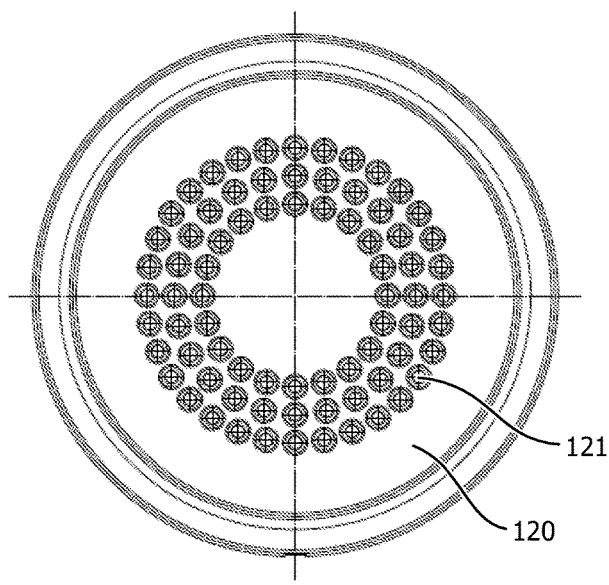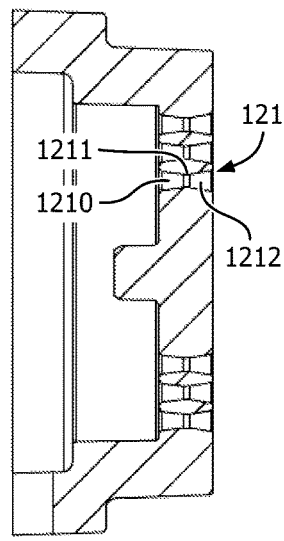
FIG. 12a  FIG. 12b

DEVICE AND METHOD FOR PREPARING EXTRUDABLE FOOD PRODUCTS

This application is the U.S. National Phase application under 35 U.S.C. § 371 of International Application No. PCT/IB2013/056145, filed on Jul. 26, 2013, which claims the benefit of International Application No. PCT/CN2012/086795 filed on Dec. 17, 2012. These applications are hereby incorporated by reference herein.

FIELD OF THE INVENTION

The invention generally relates to home electric appliances to make pastas, pastries, noodles and other extrudable food products.

BACKGROUND OF THE INVENTION

Automatic home food mixing and extrusion appliances have been in common use for many years. Automatic noodle makers which both mix dough and automatically extrude dough through a die have been disclosed and in use since 1970s. In general, such an appliance includes a working chamber in which flour and water get mixed, mixed materials (e.g., in a form of dough) is then fed to an extrusion spiral which forces the mixed materials through an extrusion die to get noodles/pastas.

U.S. Pat. No. 6,743,007B2 discloses a pasta, pastry, cookie, and hors d'oeuvre maker. In that device, a rotation shaft is connected with a driving system which includes e.g., a motor and gears is used for material (e.g., flour and water) mixing, dough kneading and stirring, and noodles/pastas extrusion. The operation process of the device is illustrated in FIG. 1. Before turning on the device, user usually needs to add/pour flour, water and/or other ingredients e.g., eggs, vegetable juice into a working chamber, in which the materials will be mixed into dough.

However, during the extrusion, stick dough pieces tend to adhere to inner walls, corners of the working chamber and therefore would not be extruded through the die as noodles or pastas.

SUMMARY OF THE INVENTION

It would be, therefore, advantageous to provide a device for preparing extrudable food products capable of extruding as much as possible mixed materials in the working chamber through the extrusion die, so as to minimize the waste of food.

According to an embodiment of the invention, a device for preparing extrudable food products comprises a working chamber capable of housing ingredients in operation of the device; an extrusion die; a rotation shaft configured for stirring and extruding the ingredients through the extrusion die; a driving system by which the rotation shaft is driven; wherein the driving system is configured to separate the extrusion by at least one time period during which the rotation shaft stirs the ingredients instead of extruding.

By separating the extrusion step which used to be one single process, it is possible to use ingredients left in the working chamber, in the extrusion die, or on the spiral of the rotation shaft as a tool, being driven by the stirring bar, to remove ingredients which stick to the inner wall of the working chamber, corners in the working chamber, by hitting and/or its stickiness. Those removed ingredients can therefore be further adhered to the ingredients in the working chamber and then be forced against the extrusion die by the spiral in the next extrusion. A waste of food is therefore reduced or even minimized.

According to an embodiment of the invention, wherein the rotation shaft is provided with a first section having at least one stirring bar extending away from the rotation shaft, and a second section having a spiral, the at least one stirring bar stirs the ingredients when the shaft rotates in a first direction, the second section extrudes the ingredients through the extrusion die by the spiral when the shaft rotates in a second direction.

According to an embodiment of the invention, wherein each of said at least one time duration is 15 seconds.

According to an embodiment of the invention, in the at least one time period, at least one ingredient piece is hit by the at least one stirring bar to remove build-ups in the working chamber.

According to an embodiment of the invention, wherein in the at least one time period, ingredients in the extrusion die and ingredients on the spiral are forced back to the working chamber, the at least one ingredient piece includes those forced back ingredients.

According to an embodiment of the invention, wherein the extrusion die is provided with a plurality of through holes, at least some of the through holes each comprises, in a direction of the extrusion, an inlet section, a shaping section and an outlet section, in that order, wherein the diameter of the shaping section is uniformed in the direction of the extrusion to smash burrs on a surface of the ingredients formed in the inlet section and/or at a joint of the inlet section and the shaping section.

According to an embodiment of the invention, the device further comprises a load detector coupled to the driving system, and a controller configured to, shut down the driving system if the detected load is below a first preset load value.

According to an embodiment of the invention, the device further comprising an indicator configured to indicate to a user an operation of the device is finished.

According to an embodiment of the invention, the driving system is coupled to an end of the rotation shaft by a connector, a strength of the connector is such configured that the connector is broken if the load of the driving system is higher than a second preset load value to protect the driving system and/or the rotation shaft.

According to an embodiment of the invention, wherein a front end of a bottom of working chamber is lower than its rear end, such as design making it easier to move the dough towards the front end of the device, e.g., towards the extrusion die.

According to an embodiment of the invention, wherein the device further comprises a container below the working chamber, which is configured to receive dies which are not in use.

According to an embodiment of the invention, the device further comprises a front panel detachable mounted to the device by at least one connector, wherein the at least one connector is configured to detach the front panel from the device without being removed from the front panel.

According to an embodiment of the invention, a method of extruding extrudable food products by an electronic device is provided. The device has a rotation shaft and an extrusion die. The method comprises the following steps: extruding the extrudable food products by the rotation shaft through the extrusion die; separating the extrusion by at least one time period during which the rotation shaft rotates in a first direction which is opposite to a second direction in which the rotation shaft rotates to extrude the food products.

Detailed explanations and other aspects of the invention will be given below.

BRIEF DESCRIPTION OF THE DRAWINGS

The particular aspects of the invention will now be explained with reference to the embodiments described hereinafter and considered in connection with the accompanying drawings, in which identical parts or sub-steps are designated in the same manner:

FIG. 10a-10b depict a process by which a noodle maker according to the present invention makes noodles;

FIGS. 11a-11b depict a typical extrusion die on a noodle maker;

FIGS. 12a-12b depict an extrusion die on a noodle maker according to the present invention;

DETAILED DESCRIPTION OF THE INVENTION

Figure 1:
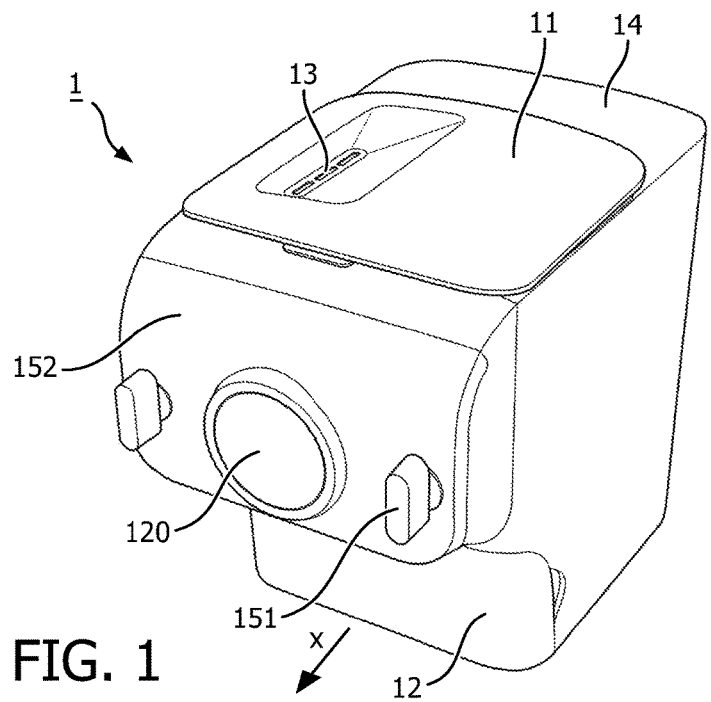
FIGS. 1-8 depict a noodle maker 10 according to an embodiment of the invention.

FIGS. 1-8 depict a noodle maker 1 according to an embodiment of the invention. Referring to FIG. 1, the noodle maker 1 comprises a lid 11 which can be hinged to a housing 14. By opening the lid 11, user can add flour into a working chamber (not shown and will be described referring to FIG. 3) where the flour is mixed with water which can be gradually added by pouring water into a water dispenser 13 having several holes on a bottom of which. In an embodiment, the noodle maker 1 starts to operate at the same time when water is being added into the working chamber via the holes. In a further embodiment, the water dispenser 13 is provided with scales (not shown) therefore user is aware of an amount of water added. In an embodiment, the lid is at least partially transparent so as to enable the user to monitor the working status in the working chamber and also to make the user feel that what you see is what you get.

A front panel 152 is detachable mounted to the housing 14 by two connectors 151. The front panel 152 is configured to mainly fix an extrusion die 120 to the noodle maker 10, which is subject a great pressure from ingredients forced by a rotation shaft (not shown) in operation of the noodle maker 10. To ease the cleaning and replacement of the extrusion die 120, connectors 151 can be loosen to remove the front panel 152 from the housing to enable the user to take out the extrusion die 120 to replace it with another extrusion die which is, for example, used to make another type of extrudable food product, or to clean the extrusion die 120. As will be described hereinafter, the connectors 151 could be remained on the front panel 152 which is already detached from the housing 14.

As will become clearer by reading the below description, the noodle maker 1 has a free space which is not occupied by those elements which work during stirring and/or extruding ingredients nor a driving system. In an embodiment illustrated in FIGS. 1-8, the free space is therefore taken by a container 12 below the working chamber, which is configured to receive dies which are not in use. For example, when an extrusion die for making pasta is installed to the housing 14 by the front panel 152, other extrusion dies with differently sized/shaped through holes which are not in used can be kept in the container 12 so as the kitchen looks more in order. The container 12 can, in an embodiment, be drawn out by hand easily in a direction x or pushed back in an opposite direction.

Figure 2:
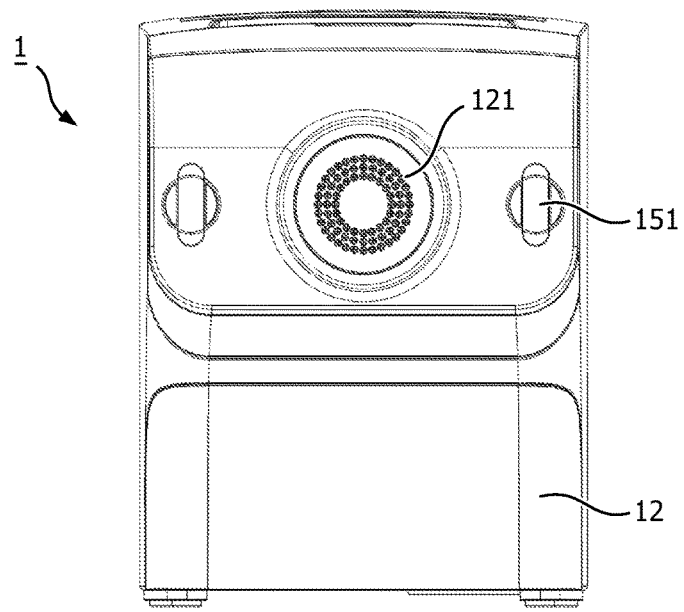
Figure 3:
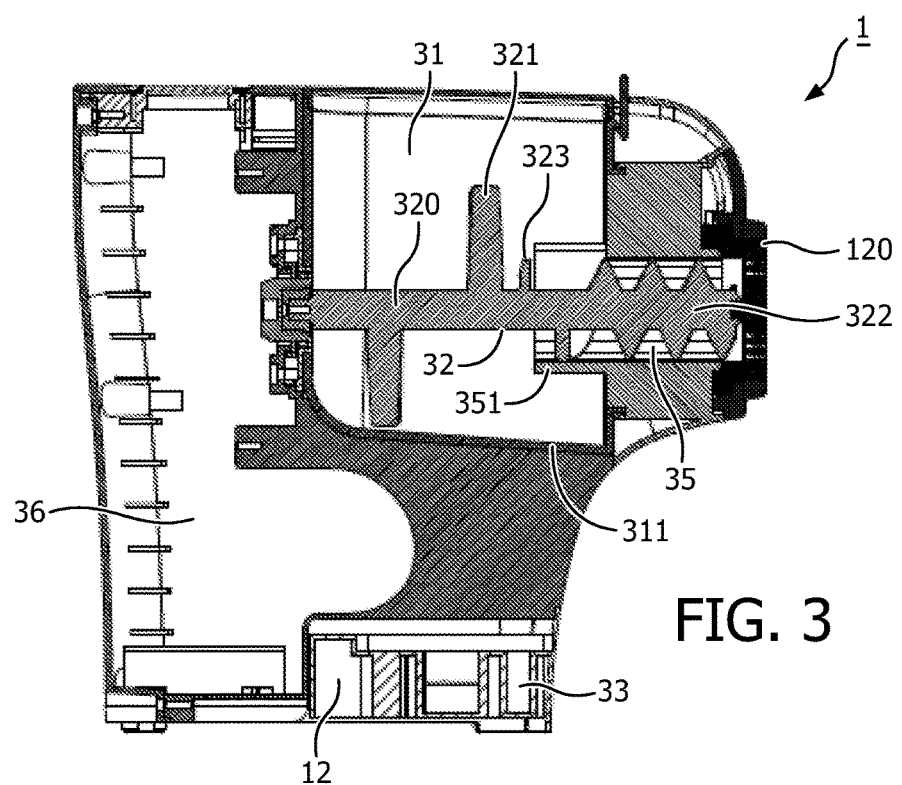

FIG. 2 illustrates a front view of the noodle maker 10 in FIG. 1. And FIG. 3 illustrates a sectional view taken based on FIG. 2. As shown in FIG. 3, referring to also FIGS. 1-2, the noodle maker 1 further comprises a working chamber 31 capable of housing ingredients, and a driver room 36 in which a driving system (not shown) is kept. A rotation shaft 32 extends in the working chamber 31 to the extrusion die 120. In an embodiment, the rotation shaft 32 is provided with a first section (on the left in FIG. 3) having at least one stirring bar 321 extending away from the rotation shaft 32, and a second section (on the right in FIG. 3) having a spiral 322 and 323, the at least one stirring bar 321 stirs the ingredients (not shown) when the shaft 32 rotates in a first direction, the second section extrudes, by the spiral 322, the ingredients through the extrusion die 120 when the shaft 32 rotates in a second direction. In an embodiment, the first direction and the second direction are mutually opposite. For example, the first direction is anticlockwise when observing the noodle maker 1 from the front (see FIG. 2) of the noodle maker 1, and the second direction is clockwise. Usually by rotating the shaft 32 in the first direction, ingredients in the working chamber 31 tends not to be forced towards the extrusion die 120 because of, at least in part, the structure of a rear part of the spiral, 323. A frond part of the spiral, 322, further extends into an extrusion channel 35 for example, by a part of the housing 14. A wall 351 of the extrusion channel 35 is, in an embodiment, extending into the working chamber 31. Thereby in extrusion process, e.g., when the shaft 32 rotates in the second direction, ingredients are thrown/lifted onto the extended wall and get forced into the extrusion channel 35 by the rotating spiral 322.

Figure 6:
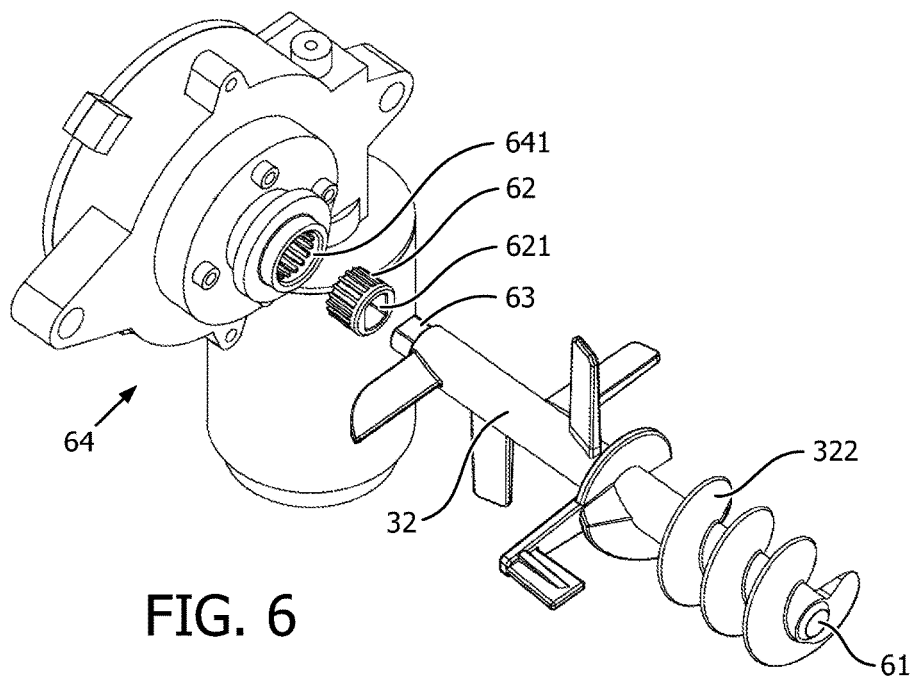

In an embodiment, the orientations and positions of the at least one stirring bars are specifically designed, for example, as further illustrated in FIG. 6, spaced from each other along the length of the shaft 32 and further offset so as to apply a force to ingredients in the working chamber 31 when rotating. In an embodiment, as illustrated, there are 4 stirring bars on the rotation shaft. All stirring bars except for the one disposed closest to the driving system (i.e., 3 in total) have the same cross section and are at a same angle to the rotation shaft. The 3 stirring bars are configured to push forward ingredients/dough pieces, i.e., towards the extrusion channel/extrusion die. The one last stirring bar, which is deposed closest to the driving system, is shaped as a triangle, pushing forward ingredients/dough pieces no matter the rotation shaft is rotating in a first or second direction. The last stirring bar is such designed to avoid, to some extent, ingredients/dough pieces from sticking thereto.

The shaft is subject to a torque force applied by the driving system and ingredients being extruded in an extrusion process. Therefore, strength of the shaft 32 is considered, and in an embodiment, the shaft 32 is made of aluminium alloy. Those skilled in the art can appreciate that other materials with acceptable strength are also applicable here.

Figure 4:
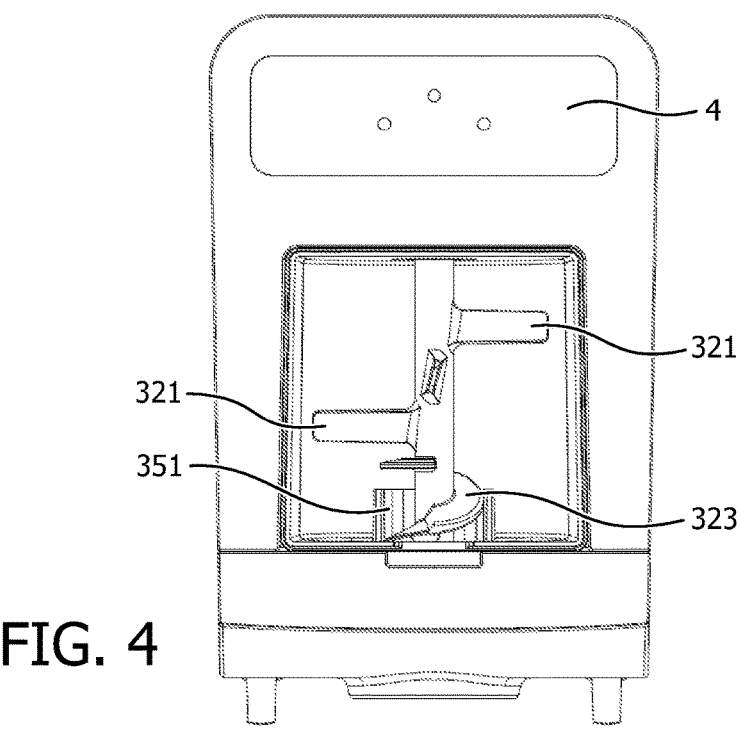
Figure 7:
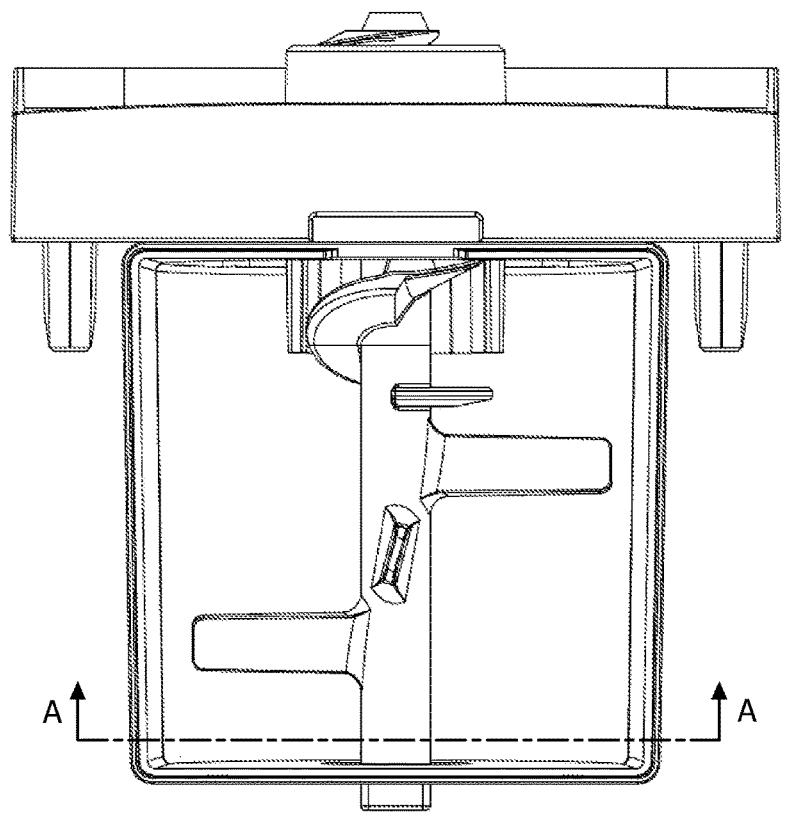
Figure 8:
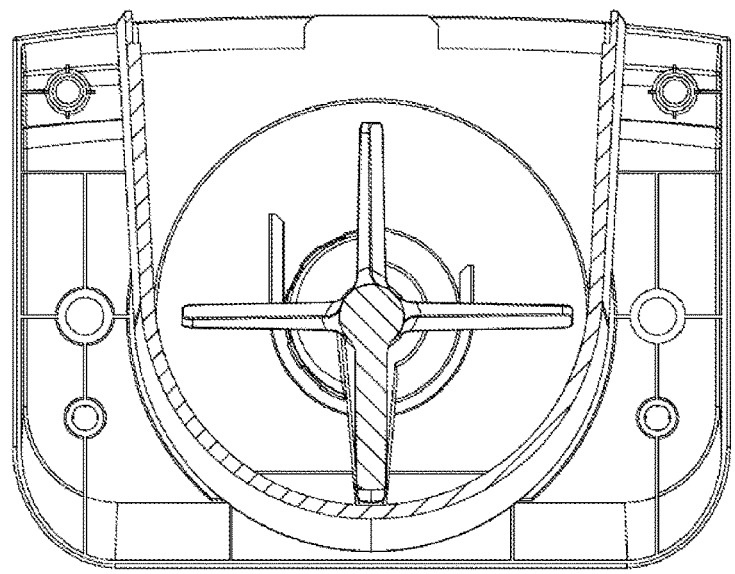

FIGS. 4 and 7 are top views of the noodle maker 1 in FIG. 1. As illustrated, a user interface (UI) 4 could be on an upper face of the noodle maker 1 which may include one or more buttons and/or other user manipulators by which user can start, stop, or otherwise change the operation status/modes of the noodle maker 1. A print circuit board (not shown) could be amounted under or close to the UI 4 and further coupled to the driving system (not shown) further below.

Figure 5:
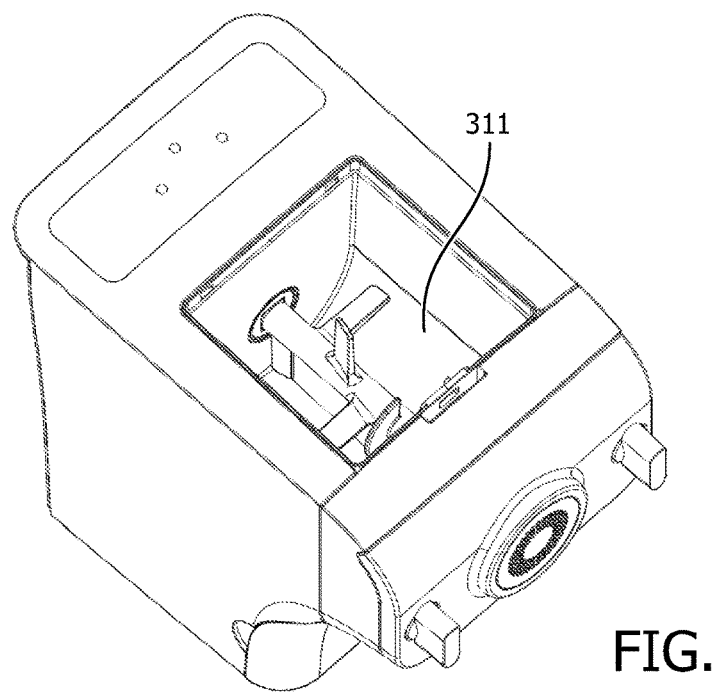

Referring to FIG. 5, wherein a perspective view of the noodle maker 1 in FIG. 1 is depicted. As illustrated thereby, a bottom 311 of the working chamber 31 is curved to facilitate the stir and mixing of water, flour and kneading of mixed materials. Further referring to FIGS. 3 and 5, a front end of the bottom 311 is lower than, in a vertical direction, a rear end of the bottom 311, the rear end is closer to the driver room 36 and the front end is closer to the front panel 152.

FIG. 6 is an exploded view of a driving system 64 and a rotation shaft 32, which are coupled to each other by a connector 62. In an embodiment, an outer surface of the connector 62 is formed like a wheel mating a first mounting hole 641 in the driving system 64. When inserted into the first mounting hole 641, the connector 62 is fixed thereto by friction. As would be appreciated by those skilled in the art, additional/alternative ways of fixing can be used as well. The inside of the connector 62 is formed as a second mounting hole 621. The hole 621 is shaped and sized to keep a rear end of the shaft 32 stable therein and prevent the shaft 32 from rotating with respect to the connector 62.

In case of misuse, or accident, some ingredients might block the rotation of the rotation shaft 32 or apply a very high force on it. For example, if there is very little water mixed with the flour, the mixed materials could be quite tough and the extrusion would be very difficult and even impossible. If so, the rotation shaft 32 and the driving system 64 are blocked or almost blocked, which is very dangerous for the driving system 64, because the gear and motor cannot withstand the high torque force (counter-force) in the blocking situation. Overheating or motor damage may occur. Since the driving system is quite expensive, this kind of accidents may also be quite costly. In an embodiment, the strength of the connector 62 is specifically designed such that: (a) during normal working condition, no break of the connector 62 occurs; and (b) when the blocking occurs, the connector 62 should break before the driving system 64 goes wrong. This is achieved by setting the strength of the connector 62 so that it is broken if a load of the driving system 64 is higher than a second preset load value. In an embodiment, the strength of the connector 62 shall be weaker than the rotation shaft 32 so as to protect the shaft 32 as well. When the connector 62 breaks, user should replace the broken one with a new one at a very limited cost because the connector 26 can be only a small plastic part.

According to embodiments of the invention, the connector 62 can be used alone, but other protection means can be used simultaneously. For example, an over-current protection on power supply for motor can cut off before the connector 62 breaks.

Figure 9:
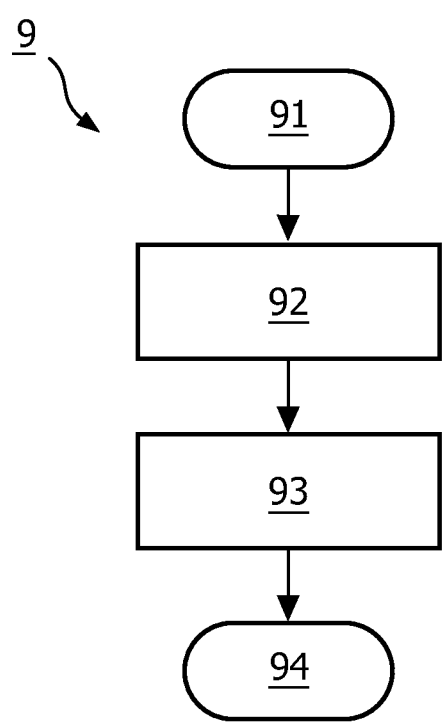
FIG. 9 depicts a process by which a noodle maker makes noodles according to a conventional method.

FIG. 9 illustrates a flow chart of a process by which a noodle maker usually makes noodles, pastas or other extrudable food products. In an embodiment, the noodle maker 1 in FIG. 1 is provided with compatibility such that the process 9 can also be followed by the noodle maker 1. As shown in FIG. 9, the process 9 includes the following steps:

Step 91: Start the operation. Usually after user has added flour and water, the driving system 64 is powered up and starts to drive the rotation shaft 32.

Step 92: Stirring step. The driving system 64 drives the rotation shaft 32 for a, e.g., anticlockwise rotation (an embodiment of the first direction) for stirring and mixing water with flour or and other ingredients if any, to get mixed materials (also referred to as ingredients), e.g., dough. This step usually takes 3-5 minutes.

Step 93: Extrusion. The driving system 64 drives the rotation shaft 32 for a clockwise rotation (an embodiment of the second direction) for extruding the dough through the extrusion die 120 to get noodles or pastas, i.e., final extruded food products. Usually this step takes 5-15 minutes.

Step 94: Stop the operation. The noodle maker uses a timer to count the time, when a preset time duration expires, the rotation of the noodle maker is stopped.

This working process 9 can make noodles/pastas, but it has the following disadvantages:

(1) During the extrusion step 93, the shaft is rotated in only one direction, which may cause some dough stick on the rotation shaft, the front panel and/or walls/corners inside the working chamber. Therefore the dough cannot be extruded thoroughly, which increases the residue left after the noodle/pasta making process.

(2) The normal working process is controlled by timers, so it would work for some certain time, no matter if the extrusion is already finished (i.e., no more dough is left inside the working chamber) or not, which is a waste of energy and device lifetime. User also needs to wait longer than he/she actually has to.

To overcome the disadvantages, a new working process 10 has been developed, as illustrated in FIG. 10. In an embodiment of the invention, the working process 10 according to which the driving system 64 drives the rotation shaft 10 wherein the driving system is configured to separate the extrusion by at least one time period during which the rotation shaft 32 rotations in a first direction in opposite to a second direction in which the rotation shaft rotates to extrude mixed dough. In an embodiment, the first direction is the direction in which the rotation shaft 32 rotates to stir and mix the ingredients. Further, in an alternative of process 10, more such time periods are added to further separate the extrusion step. That means an original extrusion step of 15 minutes might be segmented into e.g., 3 or 5 sub-stages duration of which are equal or different. By doing so, residue can be reduced and a better performance is achieved.

Specifically, referring to FIG. 10a, in step 101, the operation of the noodle maker 1 starts. In step 102, the driving system 64 rotates the rotations shaft in, e.g., a first direction to stir and mix ingredients in the working chamber 31 so as to form dough for the coming extrusion. It shall be appreciated by those skilled in the art that, it's also within the scope of the present invention if users do not use the noodle maker 1 to make dough but buy/make manually the dough which is added directly into the working chamber 31, which means step 102 is optional.

After that, in step 103, extrusion starts by rotating the rotation shaft 32 in a second direction. Referring to FIG. 3, a first part 323 of the spiral helps to collect the dough in the working chamber 31 which is then pressed forward by the second part 322 of the spiral. Under the pressure of the second part of the spiral 322, noodles/pastas are extruded through the extrusion die 120.

However, as already mentioned, in the previous stirring/mixing process (step 102 or 92), and maybe also in extrusion, a part of the dough is, however, sticked to the inner wall of the working chamber 31 or some corners inside the working chamber. That part of the dough, also referred to build-up, cannot be extruded as noodles/pastas even if the extrusion step continues for another 10 hours.

Therefore, in step 104, after extruding the dough in the working chamber for a while, e.g., 5 minutes, the rotation of the shaft 32 is reversed, which creates chances for those dough pieces which have stuck to e.g., inner walls of the working chamber 31, the lower surface of the lid 11 to return back to useful dough. According to tests, process 10 therefore requires similar or even shorter time to produce more noodles/pastas than process 9.

Specifically, those dough pieces/flour are removed from the inner wall of the working chamber, corners or from the lower surface of the lid 11 by the following: by reversing the rotation of the rotation shaft 32, dough in the holes 121, in the extrusion channel 35, surrounding the second part 322 of the spiral, are forced back into the working chamber 31 by virtue of the structure of the spiral. This enables the stirring bar 321 to hit or lift the forced back dough to various points inside the working chamber 31, including the surface of the rotation shaft 32, e.g., the first section where sticky dough can also stick to. This reversal rotation of the rotation shaft 32 makes use of the stickiness of the dough, which used to be a pure disadvantage (that is why dough pieces get stuck anyway inside the working chamber 31), to minimize the residual. In an embodiment, the dough hit/lifted by the stirring bar 321 in step 103 can include dough which is not yet extruded or filled into the extrusion channel but remained in the working chamber 31. The reversal rotation in step 104 can last e.g., 15 seconds.

Then, in step 105, extrusion continues, in which dough pieces including those removed from the corners, walls are fed to the extrusion channel for extrusion. This step could last for example another 5 minutes or longer or shorter.

When step 105 is finished, in step 107, the driving system 64 can stop driving the rotation shaft 32 and the noodle maker 1 can indicate to the user by an indicator (on the UI 4) that the process is finished or noodles/pastas are ready.

FIG. 10*b* illustrates an alternative of the embodiment in FIG. 10*a*. According to FIG. 10*b*, when extrusion is finished (step 105), an additional reversal of the rotation follows (step 106). Wherein doughs left on the spiral, in the extrusion channel (most of which shall have already been extruded) and in the holes 121 are forced back to the working chamber 31. This is for the purpose of cleaning the noodle maker 31 because those dough pieces may not be removed easily manually.

Without departing from the spirit of the invention, those skilled in the art could be readily able to, by reading descriptions above, apply different programs to the noodle maker 1 by further separating the extrusion with more such time durations. In an example, a whole operation might include the following, 1) under the control of the controller (not shown) e.g., the PCB, the shaft 32 firstly rotates for 3 minutes for stirring to form dough pieces; 2) 6 minutes extruding; 3) 15 seconds reversal; 4) 3.5 minutes extruding; 5) 15 seconds reversal; 6) 1.5 minutes extruding; 7) 10 seconds reversal.

In an embodiment of the invention, the noodle maker 1 is enabled to be reprogrammed by user. For example, it's provided with input means on the UI 4. Via the input means the user can set or change how frequently the extrusion shall be separated by those reversals and how long each reversal shall last. Each reversal can be individually set and are not necessarily equal in length. High end noodle makers can be provided with more advanced UI such as USB connector, etc., to fulfill the programming.

In an embodiment, the noodle maker 1 is provided with a function referred to as smart shut down.

Generally, noodle makers are controlled fully based on a timer, besides the safety protection if any, like over-heat, overload, etc. Due to the variation of flour type, water/flour ratio, water properties, and environment noises (like temperature/humidity), it is often very difficult to predict how long the noodle maker 1 really needs for producing the noodles/pastas, i.e., till no more noodles/pastas can be made. So generally, the duration of extrusion is designed for worst cases, which is quite long, and unnecessarily long for most cases. In an embodiment, the noodle maker 1 fulfills this function by having a load detector (not shown) and a controller (e.g., the PCB). The load detector is configured to detect a load of the driving system, and the controller is configured to bring forward the stop of the operation of the driving system if the detected load meets a preset condition. In an embodiment, bringing forward the stop of the operation of the driving system is realized by turn off the driving system earlier than the original program, for example, according to the original program at a moment T0, there are 5 minutes left for extrusion, the operation of the driving system can be stopped earlier than that, e.g., after 1 minutes from T0, at T1=T0+1 min. Alternatively, the driving system can be stopped immediately once the preset condition is met. In an embodiment, the preset condition may be any one of the following: a) a sharp drop of load of the driving system (e.g., 60%, 70%, 80% percents in 2 seconds); b) an instant load of the driving system is below a preset threshold. Those skilled in the art may adopt other conditions for the same purpose without departing from the spirit of the invention or the scope of the claims attached hereto.

According to an embodiment of the invention, the controller monitors the input current/power for the driving system 64 during extrusion and if in some extruding sub-stage (not the reversals), the input power for driving system 64 is consistently low and nearly idle-loaded, it is an indication that the extrusion is almost complete, and thus the noodle maker 1 can stop the extruding stage earlier.

Because in extrusion steps, the power consumed/outputted by the driving system 64 is usually quite high, and when it decreases to almost empty-loaded level, it means that almost no dough is still needed to be extruded, so if the control unit detects that during some certain time period (say, 20 seconds), the input power for driving system is consistently low (say, <120% of empty-loaded power consumption), the appliance can stop the extruding stage and enter the final reversal stage (for cleaning purpose, usually 5~10 sec), and then finish the whole noodle/past making process. If this smart-shutdown condition is never detected during the process, then the diagram can be just run normally, otherwise it can be finished earlier. With the smart-shutdown, the working cycle for noodle/pasta making can be shortened in most cases, and thus both save the energy and extend the lifetime of appliance (since it works less time in average for each working cycle). Of course, it also saves user's time. The smart-shutdown can be also applied to normal extruding process (no reversal sub-stages), as well as applied on our novel extruding process (with several sub-stages and reversals).

As mentioned above, in a noodle maker of the kind in any of FIGS. 1-8, noodles are extruded by pressing dough through an extrusion die. A typical extrusion die is illustrated in FIGS. 11*a*-11*b*. However, there would be some blurs on the surface of the noodles, although the blurs would usually disappear after cooking, it is not quite agreeable still before cooking.

The blurs are mainly formed in the extrusion die 110, especially when leaving the holes 111, as sectional view of which is shown in FIG. 11b. Referring to FIG. 11b, the inner structure of the holes is like a circular truncated cone, a cross section of which is like a trapezoid.

For this kind of extrusion dies, it is difficult to make the corners (on the right if observed from FIG. 11b) of output side perfectly smooth during manufacturing. All the blurs on those corners would correspondingly cause blurs on the noodle/pasta, since the output is also the narrowest part of the whole extruding holes, and thus the noodles/pastas have the greatest counter-force there.

The counter-force within the dough is because of the pressure for compressing the dough during extruding, and it is a nature of the dough to expand when the pressure is released, and thus all or some blurs on the corners would 'hurt' the surface of noodle/pasta, and during expansion, the 'hurt' would be also expanded, which then become the blurs on noodle/pasta.

According to an embodiment of the invention, an hourglass type of extrusion die holes' design can largely reduce the blurs on surface of noodles/pastas, illustrated in FIGS. 12a-12b. 6. The device according to claim 1, wherein the extrusion die is provided with a plurality of through holes, at least some of the through holes 121 each comprises, in a direction of the extrusion, an inlet section 1210, a shaping section 1211 and an outlet section 1212, in that order, wherein the diameter of the shaping section 1211 is uniformed in the direction of the extrusion to smash burrs on a surface of the noodles/pastas formed in the inlet section 1210 and/or at a joint of the inlet section 1210 and the shaping section 1211.

For the hourglass type of extrusion die holes 121, when the dough comes through, it will first come in the big opening of the inlet section 1210, and gradually be condensed until it reaches the narrowest part, the joint of the inlet section 1210 and the shaping section 1211. At that joint and in the shaping section 1211, the noodles are already formed, with desired size. And blurs formed at the joint or in the inlet section are effectively smashed thereby.

The noodles are then forced into the outlet section 1012, a diameter of which increases gradually in the direction of extrusion and thereby gives room for the noodles to stretch a bit and the 'counter-force' within noodle/pasta would also be released gradually, and when the noodles finally get out of the extrusion die 121, the noodles/pastas would no longer need to expand in size (e.g., in any radial direction), thus largely reduce the possibility of forming blurs on noodle/pasta's surface.

In most of noodle/pasta makers, driving system is formed by a motor and several gears. However, noodle/pasta makers usually require quite high torque but relatively low speed, typically 10~30 RPM. Normally a motor provides a quite high RPM, e.g., 3000~10000 RPM, so gears are used to reduce the RPM and increase the torque.

Using the above combination in a driving system for noodle/pasta makers have the following disadvantages: 1) noisy; 2) gear box is very expensive, without a gear box, noise is even higher; precision requirement for assembling is high; reliability is low; size is big; cost is high.

Figure 13:
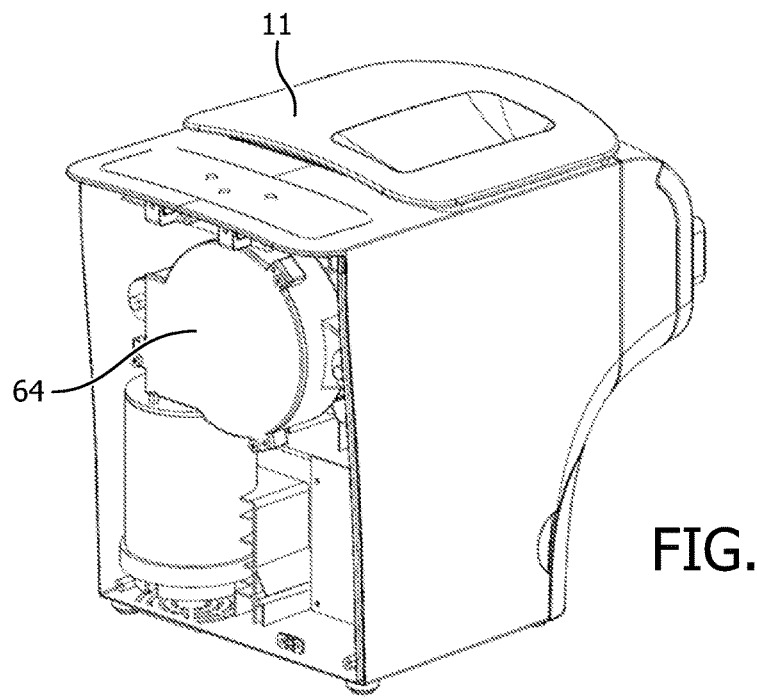
FIG. 13-14 depict a driving system in a noodle maker according to an embodiment of the invention.
Figure 14:
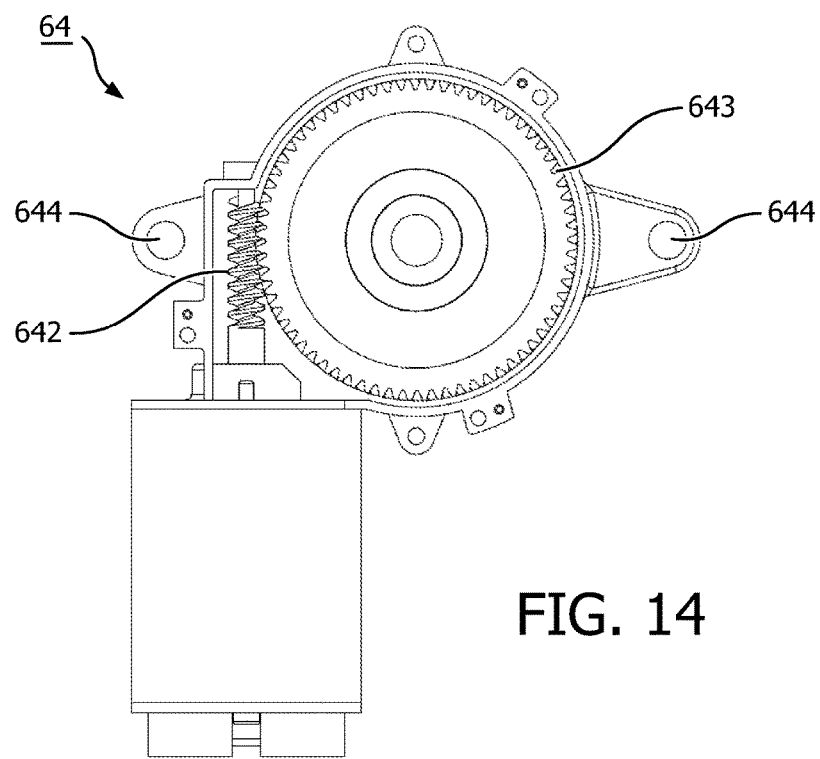

In view of the above, according to an embodiment of the invention, a driving system 64 based on a worm wheel 643 and a worm 642 is provided, as illustrated in FIGS. 13-14. The driving system 64 can be fixed to the housing 14 of the noodle maker 1 at points 644.

In an embodiment, a bevel wheel is used to to-replace a typical worm wheel which is useful for cost saving. By doing so, it's possible to use plastic to mold the wheel. Comparing to normal multi-gear solution, the worm wheel based driving system 64 has the following advantages: 1) much lower noise; 2) gear box is much smaller and thus cheaper; 3) precision requirement for assembling is lower (simpler assembly); 4) reliability is higher; 5) size is small; 6) cost is lower.

In some noodle/pasta makers, a front panel like the one shown in FIG. 1 is not only for decoration but also required for function needs. As preliminarily mentioned above, the front panel 152 is to fix parts (including the extrusion die 120) together and withstand the big pressure during extrusion. As an efficient way, the front panel 152 is fixed to the housing 14 by connectors, e.g., 2 screws.

Then, when the user needs to assemble the noodle maker 1, he/she needs to assemble the front panel 152 together with 2 screws, in total 3 parts. This would cause much trouble in keeping all parts without losing any, especially when the screws are quite small.

Also, this trouble in assembling/dissembling, since user should keep a hand to support the panel, and only one hand left for rotating the screw, so it is easy to lose 1 or more screws or cannot assemble/dissemble smoothly.

Figure 15A:
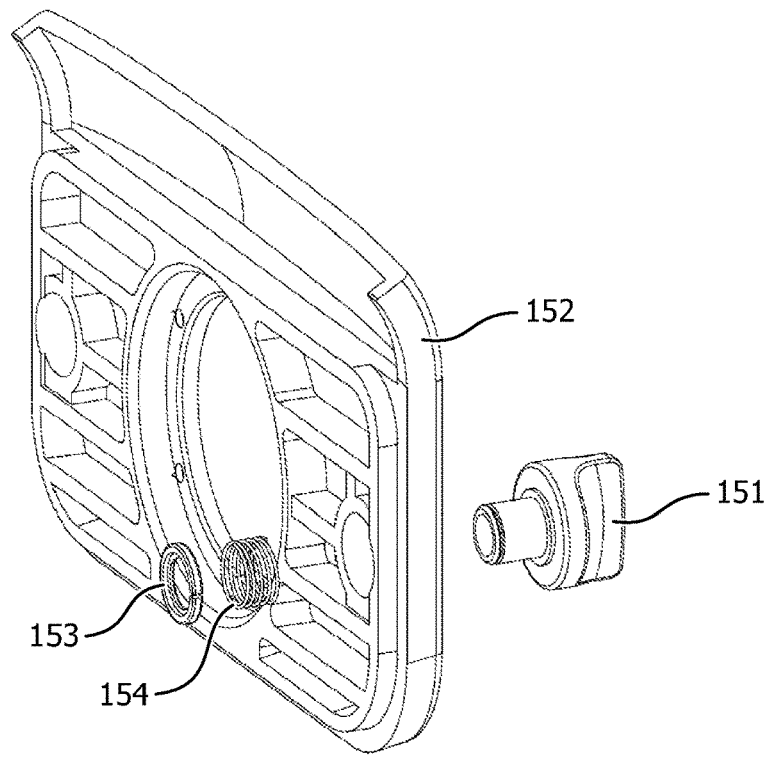
FIG. 15a-15b depict a front panel and a connector configured to connect the front panel to the device according to an embodiment of the invention.
Figure 15B:
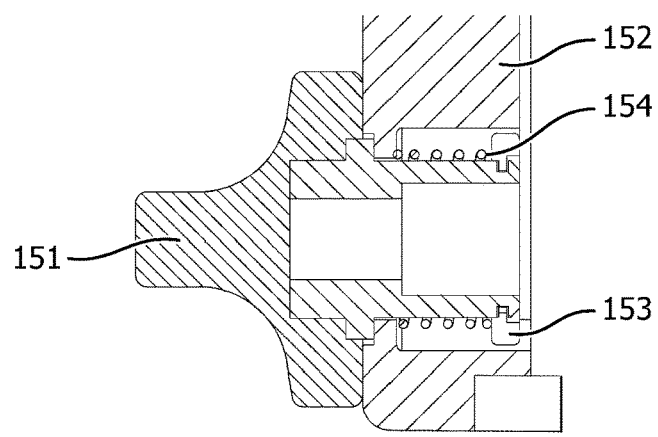

According to an embodiment illustrated in FIGS. 15a-15b, the front panel 152 is provided with screws built therein, and thus provides much more convenience to users. The screws 151 is connected to a spring 154 and a clip 153. The clip 153 prevent the screw 151 from being further detached from the front panel 152. With the aid of the spring 154, the screws 151 can still be movable along its length, which actually allows the screws 151 to be loosen or tighten, but the screws 151 can never leave the panel 152 because of the clip 153. Therefore, the user has no chance to lose the screws, and during assembling/dissembling, the one-hand operation is also much more convenient.

While the invention has been illustrated and described in detail in the drawings and foregoing description, such illustration are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single unit may fulfill the functions of several items recited in the claims. The mere fact that certain measures are recited in mutually different dependent claims does not indicate that a combination of these measured cannot be used to advantage. Any reference signs in the claims should not be construed as limiting the scope.

The invention claimed is:

1. A device for preparing extrudable food products, comprising:
   a working chamber configured to house ingredients in operation of the device;
   an extrusion die;
   a rotation shaft configured to stir the ingredients and extrude the food products into an extrusion through the extrusion die;
   a driving system by which the rotation shaft is driven; and
   a controller configured to control the driving system to separate the extrusion by at least one time period during which the rotation shaft rotates in a first direction for at least one of mixing the ingredients to form the food products and forcing the food products from the extrusion die back to the working chamber, the first direction being opposite to a second direction in which the rotation shaft rotates to extrude the food products through the extrusion die, and wherein the controller is further configured to control the driving system to drive the rotation shaft in the first direction directly before ending operation of the device when the extrusion is finished where a remaining food product remaining in the working chamber is not extrudable by the rotation shaft rotating in the second direction.

2. The device according to claim 1, wherein the rotation shaft is provided with a first section having at least one stirring bar extending away from the rotation shaft, and a second section having a spiral, the at least one stirring bar stirs the ingredients when the shaft rotates in the first direction, the second section extrudes the food products through the extrusion die by the spiral when the rotation shaft rotates in the second direction.

3. The device according to claim 1, wherein the extrusion die is provided with a plurality of through holes, at least some of the through holes each has, in a direction of the extrusion, an inlet section, a shaping section and an outlet section, in that order, wherein a diameter of the shaping section is uniformed in the direction of the extrusion to smash burrs on a surface of the ingredients formed in the inlet section and/or at a joint of the inlet section and the shaping section.

4. The device according to claim 1, further comprising a load detector coupled to the driving system, wherein the controller is further configured to stop operation of the driving system when the detected load meets a preset condition.

5. The device according to claim 4, further comprising an indicator configured to indicate to a user the operation of the device is finished.

6. The device according to claim 1, wherein a front end of a bottom of the working chamber is lower than a rear end of the bottom of the working chamber.

7. The device according to claim 1, further comprising a front panel detachably mounted to the device by at least one connector, wherein the at least one connector is configured to detach the front panel from the device without being removed from the front panel.

8. The device according to claim 1, further comprising an interface via which a user can reprogram the device.

9. A device for preparing extrudable food products, comprising:
    a working chamber configured to house ingredients in operation of the device;
    an extrusion die;
    a rotation shaft configured for stirring the ingredients and extruding the food products into an extrusion through the extrusion die; and
    a driving system by which the rotation shaft is driven,
    wherein the driving system is configured to separate the extrusion by at least one time period during which the rotation shaft rotates in a first direction which is opposite to a second direction in which the rotation shaft rotates to extrude, and
    wherein the driving system is coupled to an end of the rotation shaft by a connector, a strength of the connector is such configured that the connector is broken if a load of the driving system is higher than a preset load value.

10. A device for preparing extrudable food products, comprising:
    a working chamber configured to house ingredients in operation of the device;
    an extrusion die;
    a rotation shaft configured to stir the ingredients and extrude the food products into an extrusion through the extrusion die;
    a driving system by which the rotation shaft is driven, wherein the driving system is configured to separate the extrusion by at least one time period during which the rotation shaft rotates in a first direction which is opposite to a second direction in which the rotation shaft rotates to extrude; and
    a container arranged entirely below the working chamber, wherein the container is configured to receive dies which are not in use.

* * * * *